Figure 1:
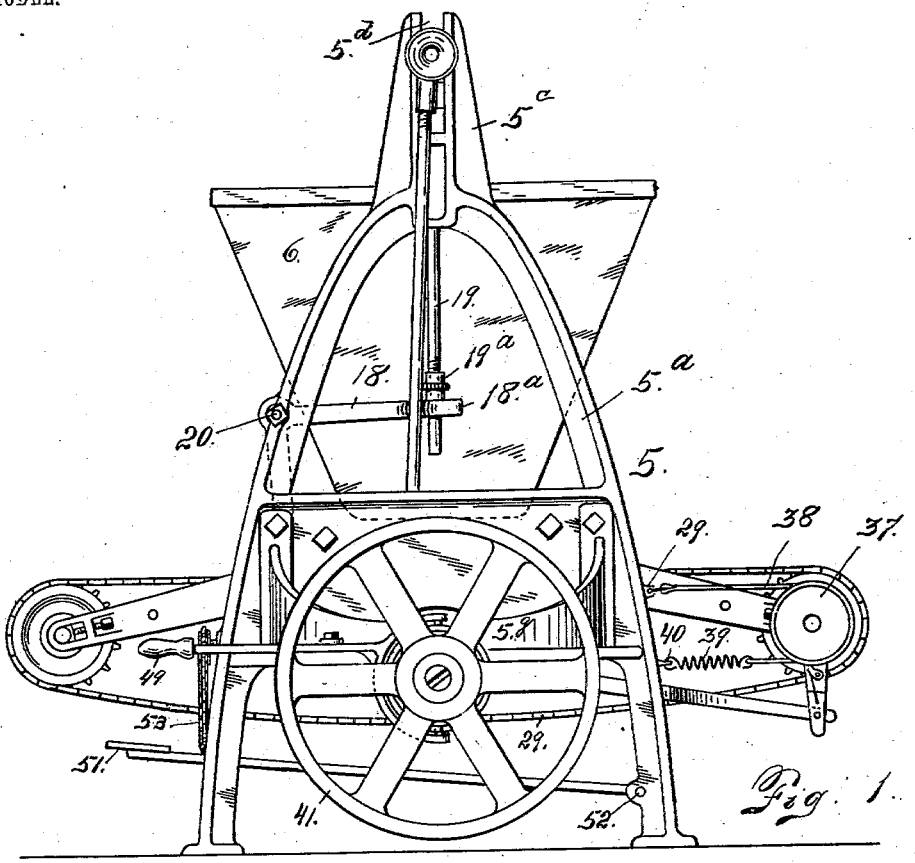

No. 740,582. PATENTED OCT. 6, 1903.
W. J. MEIKLEHAM.
CUP CAKE DROPPING MACHINE.
APPLICATION FILED NOV. 14, 1902.
NO MODEL. 4 SHEETS—SHEET 1.

Witnesses
Otto E Hoddick
Dena Nelson.

Inventor
W. J. Meikleham.
By
Attorney

No. 740,582. PATENTED OCT. 6, 1903.
W. J. MEIKLEHAM.
CUP CAKE DROPPING MACHINE.
APPLICATION FILED NOV. 14, 1902.
NO MODEL. 4 SHEETS—SHEET 2.

No. 740,582. PATENTED OCT. 6, 1903.
W. J. MEIKLEHAM.
CUP CAKE DROPPING MACHINE.
APPLICATION FILED NOV. 14, 1902.
NO MODEL. 4 SHEETS—SHEET 3.

Witnesses
Otto E. Hoddick
Dena Nelson.

Inventor
W. J. Meikleham.
By
Attorney

No. 740,582. PATENTED OCT. 6, 1903.
W. J. MEIKLEHAM.
CUP CAKE DROPPING MACHINE.
APPLICATION FILED NOV. 14, 1902.
NO MODEL. 4 SHEETS—SHEET 4.
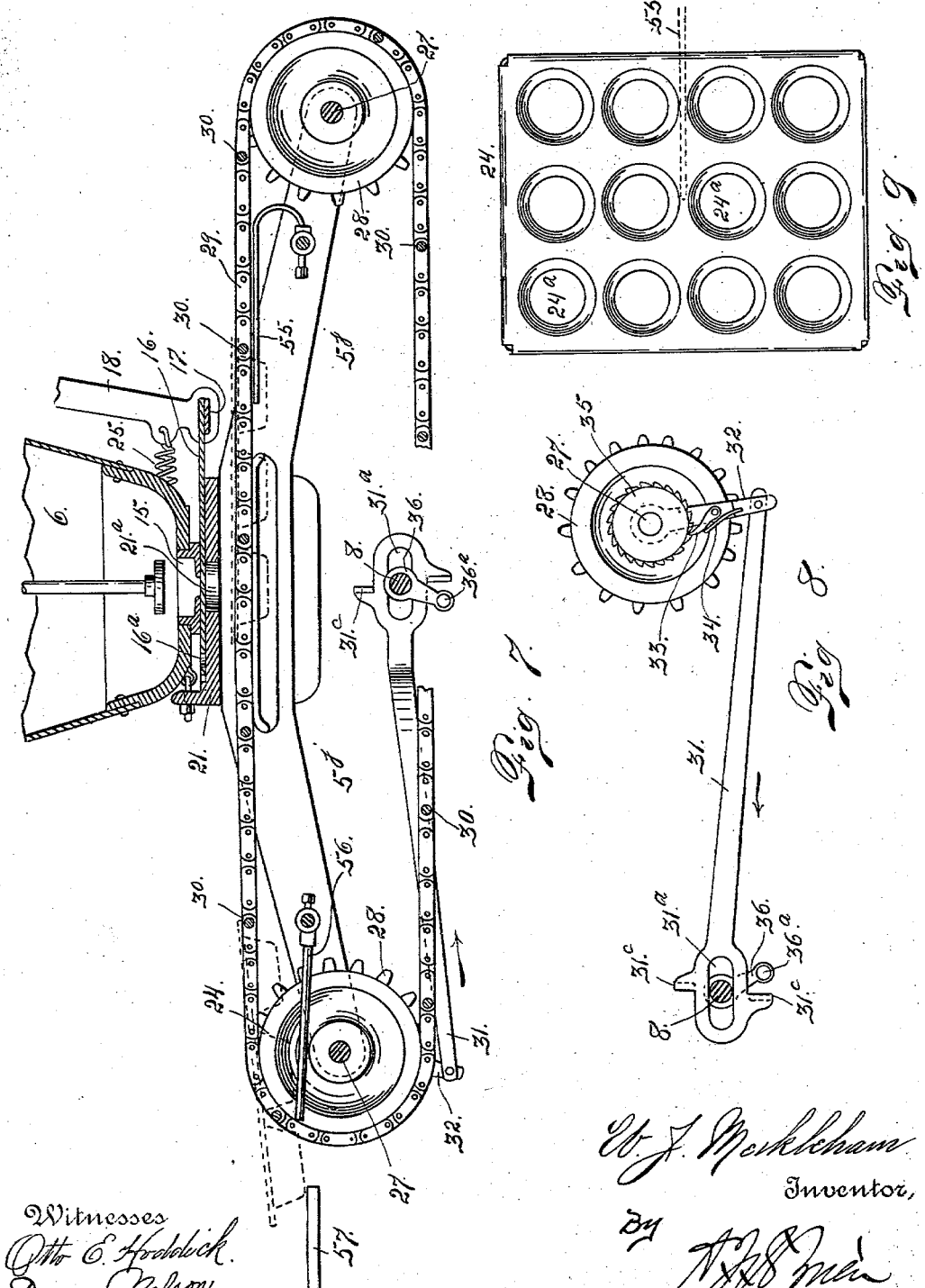
Witnesses
Otto E. Hoddick.
Dena Nelson.
W. J. Meikleham
Inventor,
By
Attorney No. 740,582. Patented October 6, 1903.

UNITED STATES PATENT OFFICE.

WILLIAM J. MEIKLEHAM, OF DENVER, COLORADO.

CUP-CAKE-DROPPING MACHINE.

SPECIFICATION forming part of Letters Patent No. 740,582, dated October 6, 1903.

Application filed November 14, 1902. Serial No. 131,399. (No model.)

*To all whom it may concern:*

Be it known that I, WILLIAM J. MEIKLEHAM, a citizen of the United States of America, residing at Denver, in the county of Arapahoe and State of Colorado, have invented certain new and useful Improvements in Cup-Cake-Dropping Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in cup-cake-dropping machines, but may be employed to advantage in all relations where it is desired to drop dough or similar material or material of a similar consistency into pans or molds in predetermined or measured quantities. Where my improved apparatus is employed, the cakes are all of the same size and weight. The dough is placed in a vat or hopper having cells in the bottom, said cells being open at the top to receive plungers for ejecting the dough through small openings in the bottom of the cells. An intermittently-actuated carrier or conveyer passes beneath the hoppers, upon which carrier or conveyer the pans are placed. A row of cups in the pan is brought beneath the cells every time the plungers descend or preparatory to their descent. As the plunger is moved upwardly a reciprocating slide located beneath the hopper closes the openings in the bottom of the cells and cuts off the escape of dough from the hopper until the plungers again descend and another row of cups is brought beneath the cells to receive their contents. All the mechanism is automatically operated from a main crank-shaft to which power is transmitted from any suitable motor or power source.

Having briefly outlined the construction of my improved machine in a very general way, I will proceed to describe the same in detail, reference being made to the accompanying drawings, in which is illustrated an embodiment thereof.

Figure 2:
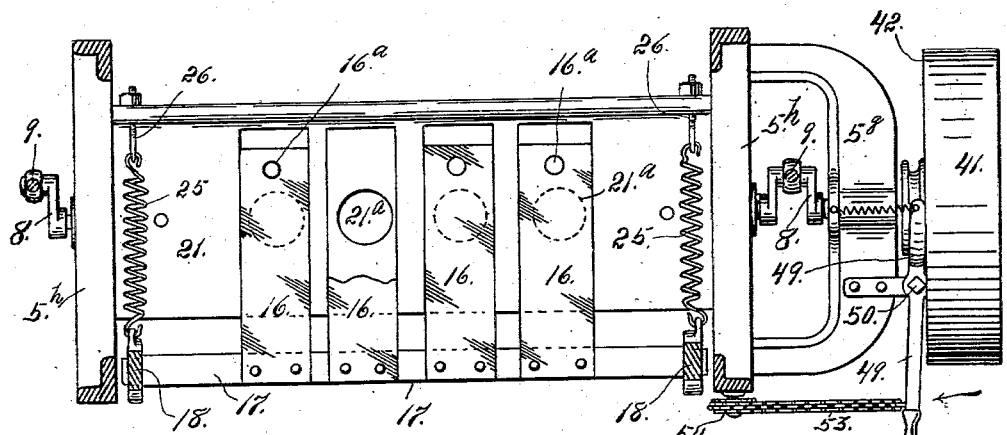
Figure 3:
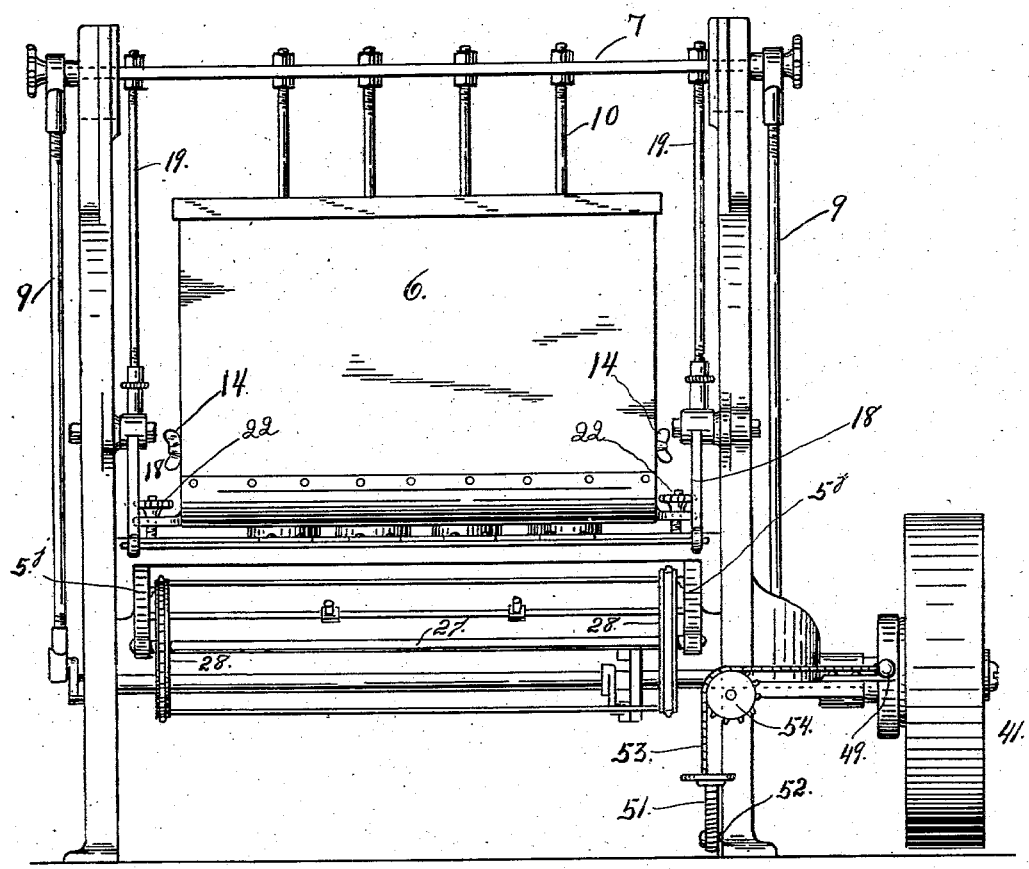
Figure 4:
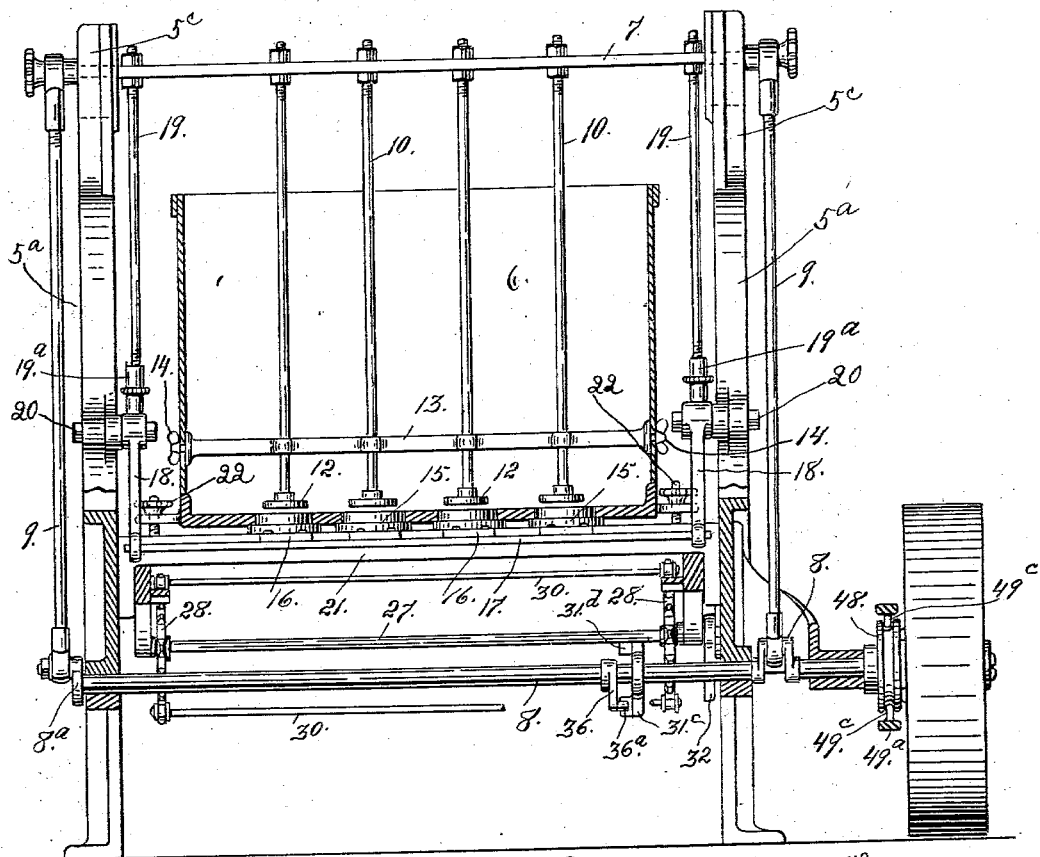
Figures 5, 6:
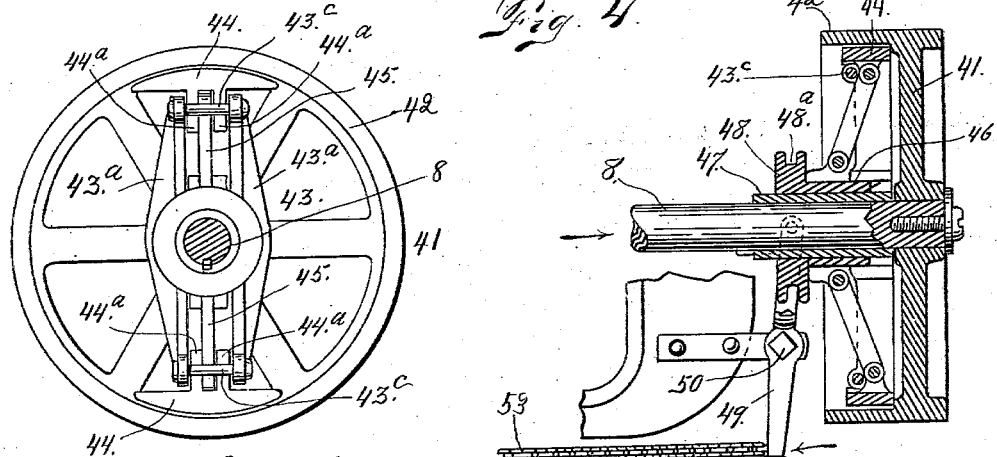

In the drawings, Figure 1 is a side elevation of my improved machine. Fig. 2 is a horizontal section taken through the frame between the hopper and the bed-plate, upon which plate the cut-off slides are mounted. Fig. 3 is a front end elevation of the machine. Fig. 4 is a vertical section taken through the hopper. Fig. 5 is a sectional view of the clutch mechanism for operating the shaft. Fig. 6 is a view of the same looking in the direction of the arrow in Fig. 5, the clutch-actuating collars and its connections being removed and the shaft shown in section. Fig. 7 is a side elevation, partly in section, illustrating the carrier or conveyer mechanism, shown on a larger scale, the upright yoke or frame members being removed. Fig. 8 is a detail view illustrating the means for automatically imparting the intermittent movement of the carrier viewed from the side opposite that shown in Fig. 7. Fig. 9 is a plan view of one of the pans.

The same reference characters indicate the same parts in all the views.

Let the numeral 5 designate the cast-iron frame as a whole, which is provided with two upright arch-shaped members $5^a$, one on each side of the hopper 6. The top $5^c$ of each member $5^a$ extending above the arch proper is slotted, as shown at $5^d$, to receive the extremity of a cross-head 7, which is connected with cranks $8^a$ of the operating-shaft outside of the upright frame members by connecting-rods 9. Attached to the cross-head by means of nuts screwed thereon both above and below it is a number of stems 10, whose lower extremities are provided with plungers 12. The stems 10 pass through a stationary cross-bar 13, mounted in the hopper and held in place by thumb-screws 14 exteriorly located and passing through openings formed in the sides of the hopper and entering threaded openings formed in the ends of the guide-bar. The bottom of the hopper is provided with a number of cells 15, corresponding with the number of plungers and having openings at the top for the entrance of the plungers. Each cell has a small opening in the bottom arranged to register with the opening $16^a$, formed in the cut-off slide 16, when the slide is properly actuated. There is one of these cut-off slides for each cell, and all the slides are connected with a bar 17, which is actuated by a pair of bell-crank levers 18, one arm of each lever being connected with the extremity of the bar 17 and the other arm of the lever with a rod 19, connected with the cross-head. Each bell-crank lever is fulcrumed on the frame, as shown at 20. The slides 16 rest on a bed-plate 21, secured to the frame, and engage recesses or ways formed in said plate directly beneath the cells, so that the slides shall have perfect freedom of movement regardless of the weight of the hopper, which rests on the bed-plate. The bed-plate is provided with openings $21^a$ beneath the openings in the cells and is connected with the bottom of the hopper by nuts 22, having the shape of hand-wheels and screwed upon upwardly-projecting bolts whose lower extremities are fast in the bed-plate and whose upper extremities protrude through lugs or ears 23, formed on the lower part of the hopper. By means of these bolts the hopper is held securely in place.

The upper arm of each bell-crank lever is provided with an eye $18^a$, through which the lower extremity of its connecting-rod passes. This rod 19 is provided with a stop $19^a$, located above the lever extremity. As the rods move downwardly the levers are actuated to draw the slides 16 outwardly, causing the openings $16^a$ in said slides to register with the openings in the bottoms of the cells 15, whereby as the plungers enter the cells the dough may be ejected therefrom into cups $24^a$ of the pan. The return movement of the slides is imparted through the instrumentality of springs 25, connected with the bed-plate at one extremity, as shown at 26, and to the lower arms of the bell-crank levers at the opposite extremity.

The crank-shaft 8 is suitably journaled in the frame, which is provided with a bow-shaped part $5^g$ on one side for the purpose. The shaft also has bearings in cross-bars 5 of the upright frame members $5^a$. The frame is provided at each end with two separated arms $5^j$, in which is journaled a shaft 27. These shafts are provided at their opposite ends with sprocket-wheels 28, made fast thereon and upon which are mounted chains 29, connected at suitable intervals by rods 30, forming a carrier or conveyer for the pans 24, which are shown in position in dotted lines in Fig. 7. When the pan rests on the carrier, one of the rods 30 passes between two rows of depending cups $24^a$, while another rod engages the flange or projecting edge of the top of the pan underneath. (See Fig. 7.) This carrier is intermittently actuated through the instrumentality of an arm 31, connected at one extremity with a lever-arm 32, fulcrumed on a shaft 27, and carrying a pivoted dog 33, engaged by a spring 34. This dog engages the teeth of a ratchet-wheel 35, fast on one of the shafts 27. The opposite extremity of the arm 31 is slotted, as shown at $31^a$, to receive the shaft 8, and is provided with upwardly and downwardly projecting lugs $31^c$, having lateral projections $31^d$, lying in the path of a pin $36^a$ on the outer extremity of a crank 36, carried by the shaft 8. As this shaft is rotated the crank first engages one projection $36^c$ and moves the arm 31 in one direction—for instance, that indicated by the arrow in Fig. 8. The arm moves sufficiently by this action of the crank to release the crank and actuate the lever-arm 32 and its dog 33 sufficiently to impart a partial rotation to the shaft 27 and the carrier composed of the wheels 28, the chains 29, and the rods 30, as aforesaid, since the wheels 28 are fast on their shafts 27. After the crank 36 has made a partial rotation and reached the point above the shaft 8 it engages the other projection $31^c$ and reverses the movement of the arm 31 and the lever-arm 32, whereby the dog is carried to its original position on the ratchet ready to impart another movement to the carrier. Mounted on the shaft 27 adjacent the ratchet-wheel is a wheel 37, fast on the shaft and engaged by a brake-band 38, connected with the frame at one extremity, as shown at 29, and with a coil-spring 39 at the opposite extremity, the spring extremity remote from the band being connected with the frame, as shown at 40. (See Fig. 1.) The object of this band is to limit the movement of the carrier to the exact degree imparted by the mechanism heretofore described and prevent any movement by reason of momentum after the actuating parts have ceased to operate.

Loosely mounted on the crank-shaft 8 is a pulley 41, having an annular flange 42. Surrounded by the pulley-flange 42 is a frame 43, made fast to the shaft and composed of two arms $43^a$, connected at their opposite extremities by pins $43^c$. Adapted to engage the pulley-flange 42 are two segmental friction-blocks 44, having lugs $44^a$, projecting upwardly toward the shaft and between the pins $43^c$ and the body of the pulley. The outer extremity of a link 45 is connected with each pair of lugs $44^a$, while the inner extremities of the links are connected with a sleeve 46, slidable on a bushing 47, fast on the shaft 8. A collar 48, having a groove $48^a$ in its periphery, is formed integral with the sleeve 46 and is engaged by pins $49^c$, belonging to bifurcated arms $49^a$ of a lever 49, fulcrumed at 50. It is evident that when the arm of this lever remote from the collar 48 is moved in the direction indicated by the arrow in Figs. 2 and 5 the collar 48, the sleeve 46, and the inner extremities of the links 45 will be forced toward the pulley 41, whereby the friction-blocks 44 will be forced against the flange 42 of the pulley, causing the rotation of the shaft when the pulley is in motion. The pulley is supposed to be continuously in motion; but the rotation of the shaft is controlled by the clutch mechanism just described. The clutch-shifting lever 49 is actuated by a foot-lever 51, fulcrumed on the frame at 52 and connected with the lever 49 by a chain 53, passing over a sprocket 54, mounted on the frame.

From the foregoing description the operation of my improved machine will be readily understood. The pulley 41 is connected with the line-shaft or any other suitable source of power by a belt. (Not shown.) When it is desired to set the machine in motion, the operator presses downwardly on the foot-lever 51, actuates the lever 49, and operates the clutch mechanism to cause the rotation of the shaft 8 by virtue of the construction and arrangement of parts heretofore described. Before the commencement of the operation of the machine it is assumed that a suitable quantity of cake-dough has been placed in the hopper 6. It will also be assumed that the plungers 12 are raised, as shown in Fig. 4 of the drawings, and that the cells 15 are therefore full of dough. The slides 16 are also in the position shown in Fig. 2, the cells being closed to prevent the escape of the dough. Now as the shaft 8 begins to rotate the plungers are forced downwardly, causing the outward movement of the slides 16, through the instrumentality of the bell-crank levers, whereby the openings 16$^a$ of the slides are made to register with the openings in the bottom of the cells. Then as the plungers enter the cells the predetermined or measured quantity of dough is forced out of the cells into the cups 24$^a$ of the pan 24. During the next half-rotation of the shaft 8 the plungers are carried upwardly and the slides 16 return to their normal position, closing the cells 15 by virtue of the recoil of the springs 25. Simultaneously with this operation the crank 36 of the shaft 8 has actuated the arm 31 enough to impart a movement to the pan-conveyer sufficiently to remove the row of filled cups from beneath the cells and bring another row of cups into line beneath the cells ready for the next ejecting act of the plungers. Then as the crank-shaft makes another half-turn the crank 36 shifts the arm 31 sufficiently to reverse the lever-arm 32 and bring the dog 33 into position to impart another movement to the carrier as the arm 31 is again shifted in the direction of the arrow in Figs. 7 and 8. In this manner the pan-conveyer is intermittently actuated and the pans carried forwardly step by step thereon. A central guide-finger 55, mounted on the frame, engages the pan centrally between the cups and guides it as it travels beneath the hopper, while guide-fingers 56 engage the pans on opposite sides as they leave the carrier and engage a table or other support. (See Fig. 7.)

Having thus described my invention, what I claim is—

1. In a cup-cake-dropping machine, a frame composed of two upright arch-shaped members, having their extremities above the arch, slotted, a bed-plate interposed between the frame members, and a pair of arms projecting endwise in opposite directions from each upright frame member on opposite sides of the machine.

2. In a cup-cake-dropping machine, the combination of separated upright frame members, a bed-plate interposed between the frame members and provided with openings, a hopper or receptacle for the dough, above the bed-plate and mounted thereon, said hopper having cells open at the top and provided with small openings at the bottom, said cells being in line with the openings in the bed-plate, and vertically-reciprocating plungers for ejecting the dough from the cells and forcing it through the openings in the bed-plate.

3. The combination with a suitable frame provided with a bed-plate having openings, a hopper mounted above the bed-plate and having cells in its bottom, the said cells having bottom openings in line with the openings in the bed-plate, a cut-off slide resting on the bed-plate and normally closing the bottom openings of the cells, plungers for ejecting the dough from the cells, and means for automatically operating the cut-off slide to harmonize with the operation of the plungers.

4. The combination with a suitable frame having a bed-plate provided with openings, a hopper located above the bed-plate and having cells provided with outlet-openings in line with the openings of the bed-plate, cut-off slides mounted on the bed-plate above the openings therein and having openings normally out of line with the openings in the cells and bed-plate, plungers for ejecting the dough from the cells, a crank-shaft, and means connected with the crank-shaft for automatically operating the plungers and cut-off slide, whereby the openings in said slide are made to register with those of the cells and bed-plate as the plungers descend into the cells to perform the dough-ejecting act.

5. The combination with a suitable frame having a bed-plate provided with openings, of a hopper mounted thereon above the bed-plate and provided with cells having openings below in line with the openings in the bed-plate, cut-off means interposed between the hopper and bed-plate for controlling the said openings, means for ejecting the dough from the cells, an operating-shaft, means connected with the shaft for automatically operating the dough-ejecting means and the cut-off means, and an intermittently-operated pan-conveyer arranged to travel below the hopper.

6. The combination with a suitable frame having a bed-plate provided with openings, of a hopper mounted thereon and having bottom openings in line with the openings of the bed-plate, means for controlling the said openings to regulate the escape of the dough, means for ejecting the dough in measured quantity, means for automatically actuating the means for controlling the escape of the dough and the ejecting means, whereby the two sets of devices are made to operate in simultaneous harmony.

7. The combination with a suitable frame provided with a bed-plate having openings, of a hopper mounted thereon and provided with openings for the escape of the dough, the hopper and bed-plate openings being arranged to register, cut-off means for controlling said openings, ejecting means for forcing the dough through the openings in predetermined, measured quantity, a pan-conveyer arranged to travel beneath said hopper, and means for automatically operating the dough-ejecting means, the cut-off means, and the pan-conveyer, whereby the three sets of devices shall operate in harmony, substantially as described.

8. The combination with a suitable frame provided with a bed-plate having openings, of a hopper mounted thereon and having openings in line with the bed-plate openings, means for ejecting the dough in predetermined, measured quantity from said openings, cut-off means for controlling the escape of dough from the hopper, a carrier arranged to travel intermittently or step by step beneath the hopper, a main operating-shaft, and means connected with said shaft for automatically operating the dough-ejecting means, the cut-off means and the carrier in simultaneous harmony.

9. The combination with a suitable frame, of a hopper or dough-receptacle mounted thereon and open at the bottom for the escape of dough, means for ejecting the dough in predetermined, measured quantity, a cut-off slide for controlling the escape of dough from the hopper, spring-held bell-crank levers for operating the slide, and means for automatically operating the levers in harmony with the dough-ejecting mechanism.

10. The combination with a suitable frame, of a hopper mounted thereon and having openings, plungers for ejecting dough in predetermined quantity from said openings, a cross-head with which said plungers are connected, a crank-shaft, rods connecting the crank-shaft with the cross-head, a cut-off slide, spring-held levers connected with said slide, and rods connecting the bell-crank levers with the cross-head whereby the cut-off slide and plungers are made to operate in harmony.

11. The combination with a suitable frame, of a hopper mounted thereon and having cells provided with bottom openings, plungers for ejecting dough from said cells, a cut-off slide for controlling the escape of dough from the cells, bell-crank levers fulcrumed on the frame and having one arm of each connected with the slide, a cross-head with which the plungers are connected, rods connecting one arm of each lever with the cross-head, a coil-spring connecting the other arm of each lever with the frame, a crank-shaft, and rods connecting said shaft with the cross-head in operative relation.

12. The combination with a suitable frame having a bed-plate provided with openings, of a hopper mounted thereon and having bottom openings in line with the plate-openings, means for ejecting the dough from said openings in predetermined, measured quantity into pans for the purpose, and a pan-conveyer having an intermittent or step-by-step movement below the hopper, and means for automatically operating the said conveyer in harmony with the dough-ejecting means.

13. The combination with a suitable frame having a bed-plate provided with openings, of a hopper mounted thereon and having openings in line with the bed-plate openings, means for ejecting the dough from the hopper through the bed-plate openings into pans beneath, a pan-conveyer, a frame therefor, wheels journaled in the frame on which the conveyer is mounted, an operating crank-shaft, and a suitable connection between said crank-shaft and a conveyer-wheel for imparting an intermittent movement to the conveyer, substantially as described.

14. In a cup-cake dropping machine, the combination with a suitable frame having a bed-plate provided with openings, of a hopper mounted thereon and having openings for the escape of the dough, the hopper-openings and the bed-plate openings being arranged to register, means for ejecting the dough through said openings into pans beneath the bed-plate, a pan-conveyer mounted beneath the bed-plate and comprising chains and connecting-rods, shafts journaled in the frame, sprocket-wheel mounted on the shafts and engaged by the chains of the conveyer, an operating crank-shaft, a lever-arm journaled on a shaft of the carrier-wheels, a ratchet-and-dog connection between said last-named shaft and the lever, and an arm connecting the crank-shaft with the said lever for imparting an intermittent movement to the carrier, substantially as described.

15. The combination with a suitable frame, of a hopper mounted thereon and having openings for the escape of the dough into pans in predetermined, measured quantity, conveyer-shafts journaled in the frame, wheels mounted on said shafts, an endless pan-conveyer mounted on the wheels, a ratchet-wheel fast on one of the carrier-shafts, a lever-arm fulcrumed on said last-named shaft, a dog carried by said arm, a main operating-shaft, an arm connecting the operating-shaft with the ratchet-lever, said arm being slotted to receive the operating-shaft, and provided with projections above and below the shaft, and a crank on the operating-shaft for actuating the slotted arm whereby an intermittent movement is imparted to the pan-conveyer, substantially as described.

16. In a cup-cake-dropping machine, the combination with a suitable frame, of cupcake-dropping mechanism mounted thereon, a shaft connected in operative relation with said mechanism for automatically operating the same, a loose pulley mounted on the shaft, friction clutch mechanism also mounted on the shaft adjacent the pulley, and arranged to be controlled by the operator, whereby the operating-shaft may be started and stopped at pleasure, substantially as described.

17. The combination with a suitable frame, of a bed-plate connected with the frame and having openings, a hopper mounted above the bed-plate and having cells in its bottom, the said cells having bottom openings in line with the openings in the bed-plate, a cut-off slide interposed between the hopper and the bed-plate, and means for operating said slide.

In testimony whereof I affix my signature in presence of two witnesses.

WILLIAM J. MEIKLEHAM.

Witnesses:
DENA NELSON,
A. J. O'BRIEN.